(12) United States Patent
Enjou

(10) Patent No.: US 6,493,746 B1
(45) Date of Patent: Dec. 10, 2002

(54) MULTI-OPERATOR NETWORK MANAGEMENT SYSTEM AND METHOD USING TRANSACTION PROCESSING

(75) Inventor: Atsushi Enjou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/281,055

(22) Filed: Mar. 10, 1999

(30) Foreign Application Priority Data

Mar. 11, 1998 (JP) ............................................ 10-058726

(51) Int. Cl.[7] .............................................. G06F 15/16
(52) U.S. Cl. ........................ 709/208; 709/201; 709/203; 709/210; 709/217; 709/237; 707/8; 707/10; 707/103; 710/200
(58) Field of Search ................................ 709/201–203, 709/208–211, 217–218, 223, 237; 707/8–10, 103–104; 717/10–103, 108; 710/200

(56) References Cited

U.S. PATENT DOCUMENTS

| 5,615,373 | A | * | 3/1997 | Ho ................................ 707/8 |
| 5,734,898 | A | * | 3/1998 | He ............................. 709/203 |
| 5,752,028 | A | * | 5/1998 | Ellacott ...................... 707/103 |
| 5,956,712 | A | * | 9/1999 | Bennett ......................... 707/8 |
| 6,085,234 | A | * | 7/2000 | Pitts et al. .................. 709/217 |
| 6,134,597 | A | * | 10/2000 | Rieth et al. ................. 709/237 |
| 6,178,440 | B1 | * | 1/2001 | Foster et al. ................ 709/201 |

FOREIGN PATENT DOCUMENTS

| JP | 6-103142 | 4/1994 |
| JP | 6-224868 | 8/1994 |
| JP | 9-81438 | 3/1997 |
| JP | 9-146817 | 6/1997 |
| JP | 9-325929 | 12/1997 |
| JP | 11-252209 | 9/1999 |

* cited by examiner

Primary Examiner—Bharat Barot
(74) Attorney, Agent, or Firm—Sughrue Mion, PLLC

(57) ABSTRACT

A network management system for a network, in which server object operates on a server realizing function of network management and client object corresponding to the server object operates on a client, has a lock obtaining portion which locks corresponding server object when a condition of one of the server objects corresponding to one client object is varied associating with operation for the one client object, locks other server objects associated with the one of server objects; and notifies locked condition to all of client objects corresponding to locked server object.

27 Claims, 9 Drawing Sheets ated on a client, wherein the server comprises
MULTI-OPERATOR NETWORK MANAGEMENT SYSTEM AND METHOD USING TRANSACTION PROCESSING

BACKGROUND OF THE INVENTION

1. Field of the Invention

The present invention relates generally to a network management system and a network management method. More particularly, the invention relates to a network management system and a network management method which can realize multi-operator without making process complicate.

2. Description of the Related Art

In the conventional network management system, in order to realize multi-operator for performing management operation of the network simultaneously and with maintaining matching ability of data, transaction processing is employed. When some object is operated and used by a transaction process, the object is operated after locking the object.

Namely, when the locked object is associated with other object, all of the associated objects have to be locked from a client side to make the process complicate. On the other hand, whether the object can be locked or not can be judged only after attempting of locking.

Here, the transaction processing is a technology for guarantee matching of the transaction in distributed computing environment and is basically consisted of two phases.

At first, preparation for updating (normally, locking of resource to be an object for updating in a first phase, and updating process is actually performed for the object locked at the first phase in a second phase. By these two phases, matching of data included in the transaction under distributed computing environment can be maintained.

In the conventional network management system set forth above, it becomes necessary to directly perform locking for the object to be operated from the client. For example, a certain object "A" is to be operated by locking the object "A", if the object "A" is in relationship with other object "B" to influence with each other, the object "B " has to be locked. Otherwise, other operator may operate the object "B" to cause unmatching of data.

In order to avoid this, the client has to preliminarily recognize relationship of all of the objects or, in the alternative, the client has to directly lock all of the related objects based on judgment upon operating the object. Thus, process becomes complicate.

On the other hand, in the transaction process, locking condition of the object cannot be detected preliminarily and can be detected only after initiation of the process. Therefore, the operator is forced to perform useless operation.

SUMMARY OF THE INVENTION

A first object of the present invention is to provide a network management system which can realize multi-operator without causing useless operation of the operator and making the process complicate.

A second object of the present invention is to provide a network management system which will not cause discrepancy or unmatching of data without requiring a plurality of operators to pay attention for relationship of objects to be managed on a display screen.

A third object of the present invention is to provide a network management system which can make judgement whether the operator may operate the object on the display screen before actual operation.

A fourth object of the present invention is to provide a network management system which does not cause deadlock even when timeout is caused in a condition where the object to be managed is locked.

According to the first aspect of the invention, a network management system for a network, in which server object operates on a server realizing function of network management and client object corresponding to the server object opermeans for locking corresponding server object when a condition of one of the server objects corresponding to one client object is varied associating with operation for the one client object, means for locking other server objects associated with he one of server objects, and means for notifying locked condition to all of client objects corresponding to locked server object.

In the preferred construction, the client comprises means for varying displacement condition of a display screen of the client object to show locked condition on the basis of notice of locked condition to the client object.

In another preferred construction, the client comprises means for restricting external operation for the client object when display condition of the client object is varied.

In another preferred construction, the server comprises storage means for preliminarily storing information of other server objects associated with one of server objects with correspondence to the one of server objects.

In another preferred construction, the server comprises means for generating key information specifying the server object upon locking of the server object, and storage means for storing the key information with correspondence to the server object, management of locking condition for the server object and management of variation of display condition of the client object being managed on the basis of the content of storage means.

In another preferred construction, the server comprises timer means for detecting whether a given period is elapsed after locking of the server object, and means for releasing locked condition of all of the server object upon detection of elapsing of the given period by the timer means.

In another preferred construction, the client comprises timer means for measuring a lock continuation period of the server object, and means for calling updating process of lock condition when a lock continuation period of the timer elapses the given period, and the server comprises means for updating lock condition of the server object depending upon call from the client.

In another preferred construction, the server comprises means for generating a key information specifying the server object upon locking of the server object, storage means for storing the key information corresponding to the server object, and means for updating lock condition of the server object depending upon call from the client, and the client comprises key storage means for storing key information from the server, timer means for measuring a lock continuing period of the server object, and means for calling updating process of lock condition by reading out the key information from the key storage means when the lock continuing period of the timer elapses the given period, the lock updating means of the server updating locking of the server object corresponding to the key information by calling from the client.

In another preferred construction, the server comprises means for generating a key information specifying the server object upon locking of the server object, storage means for storing the key information corresponding to the server object, and means for updating lock condition of the server object depending upon call from the client, and the client comprises key storage means for storing key information from the server, timer means for measuring a lock continuing period of the server object, and means for calling updating process of lock condition by reading out the key information from the key storage means when the lock continuing period of the timer elapses the given period, the lock releasing means of the server performs lock releasing of the server object in the case where key information from the client is proper, and erases the key information.

According to the second aspect of the invention, a network management system for a network, in which server object operates on a server realizing function of network management and client object corresponding to the server object operates on a client, wherein the server comprises means for excluding access from other client by locking the server object on the server corresponding to the client object to be operated on the client, and means for reflecting exclusive condition of the server object in real-time.

According to the third aspect of the invention, a management method in a network management system for a network, in which server object operates on a server realizing function of network management and client object corresponding to the server object operates on a client, comprising the steps of:

the server locking corresponding server object when a condition of one of the server objects corresponding to one client object is varied associating with operation for the one client object;

locking other server objects associated with the one of server objects; and notifying locked condition to all of client objects corresponding to locked server object.

In the preferred construction, the client varies displacement condition of a display screen of the client object to show locked condition on the basis of notice of locked condition to the client object.

In another preferred construction, the client restricts external operation for the client object when display condition of the client object is varied.

In another preferred construction, the server generates a key information specifying the server object upon locking of the server object, stores the key information corresponding to the server object, and management of locking condition for the server object and management of variation of display condition of the client object are managed on the basis of the content of storage means.

In another preferred construction, the server detects whether a given period is elapsed after locking of the server object, and releases locked condition of all of the server object upon detection of elapsing of the given period by the timer means.

In another preferred construction, the client measures a lock continuation period of the server object, and calls updating process of lock condition when a lock continuation period of the timer elapses the given period, and the server updates lock condition of the server object depending upon call from the client.

In another preferred construction, the server generates a key information specifying the server object upon locking of the server object, stores the key information corresponding to the server object, and updates lock condition of the server object depending upon call from the client, and the client stores key information from the server, measures a lock continuing period of the server object, and calls updating process of lock condition by reading out the key information from the key storage means when the lock continuing period of the timer elapses the given period.

In another preferred construction, the server generates a key information specifying the server object upon locking of the server object, stores the key information corresponding to the server object, and updates lock condition of the server object depending upon call from the client, and the client stores key information from the server, calls lock releasing process of the server by identifying the server object by the key information, and erases the key information, when the key information from the client is proper, lock releasing of the server object is performed and the key information is erased.

According to the fourth aspect of the invention, a management method in a network management system for a network, in which server object operators on a server realizing function of network management and client object corresponding to the server object operates on a client, comprising the steps of establishing a manager as server/client server, excluding access from other client by locking the server object on the server corresponding to the client object to be operated on the client, and reflecting exclusive condition of the server object in real-time.

According to another aspect of the invention, a computer readable memory storing a management program active in a network management system for a network, in which server object operates on a server realizing function of network management and client object corresponding to the server object operates on a client, the management program comprising the steps of in the server locking corresponding server object when a condition of one of the server objects corresponding to one client object is varied associating with operation for the one client object, locking other server objects associated with the one of server objects, and notifying locked condition to all of client objects corresponding to locked server object.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
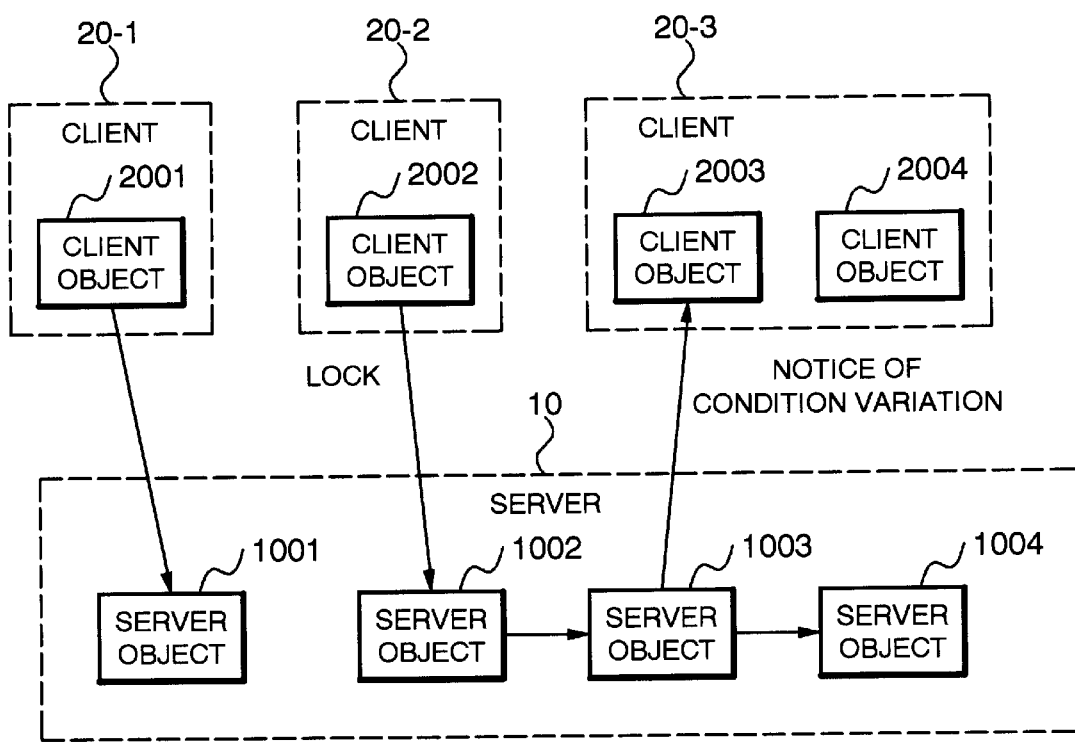
FIG. 1 is a block diagram showing a construction of the first embodiment of a network management system according to the present invention.

FIG. 1 is a block diagram showing a construction of one embodiment of a network management system according to the present invention.

In FIG. 1, the shown embodiment of the network management system according to the present invention is constructed with a server 10 as a process on a computer for realizing network management function and a plurality of clients 20-1 to 20-3. On the server 10, a plurality of server objects 1001 to 1004 of the objects to be object for management operate. On the clients 20-1 to 20-3 as a process on the computer having network management screens to be operated by operators, client object 2001 to 2004 as symbol to be displaced in graphic user interfaces (GUI) corresponding to the server object and on the network management screen.

Figure 2:
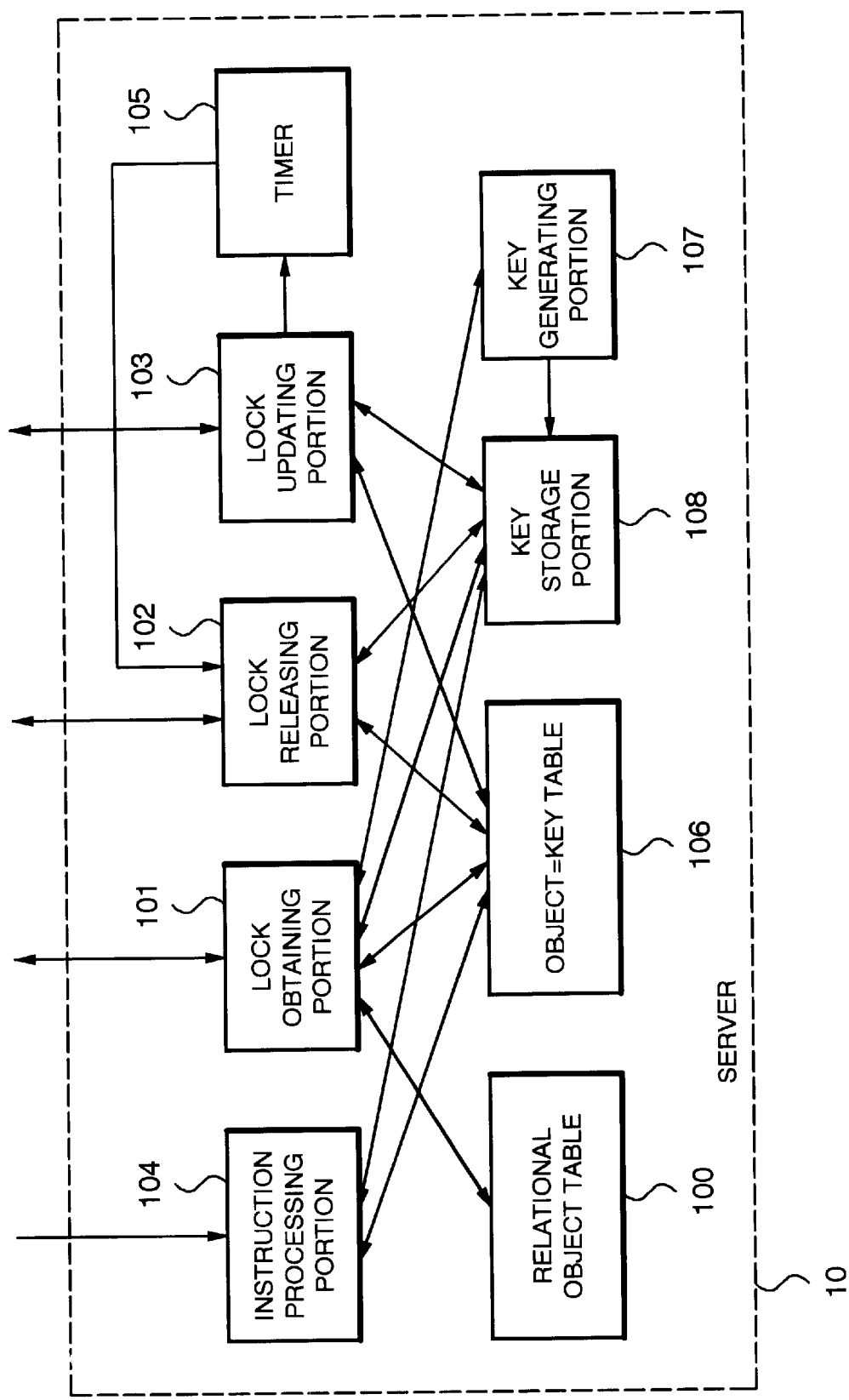
FIG. 2 is a block diagram showing a construction of server in the network management system shown in FIG. 1.

FIG. 2 is a block diagram showing a construction of the server 10 set forth above. As shown, the server 10 is constructed with a relational object table 100, a lock obtaining portion 101, a lock releasing portion 102, a lock updating portion 103, an instruction processing portion 104, a timer 105, an object=key table 106, a key generating portion 107, and a key storage portion 108.

In the relational object table 100, other server objects having relationship with respective server objects 1001 to 1004 are preliminarily registered with correspondence to respective server objects 1001 to 1004. Other server objects having relationship are server objects to be influenced depending upon conditions of the server objects other than own object.

In the condition shown in FIG. 1, the server object 1003 is related to the server object 1002, and the server object 1004 is related to the server object 1003. In the relational object table 100, the server object 1003 is registered with correspondence to the server object 1002, and the sever object 1004 is registered with correspondence to the server object 1003.

As shown in FIG. 2, the lock obtaining portion 101 checks a content of the key storage portion 108 corresponding to the server object 1002 when the server object 1002 is called from the client object 2002, for example. If the content of the key storage portion 108 corresponding to the server object 1002 is empty, new key corresponding to the server object 1002 is generated by the key generating portion 107. The newly generated key is stored in a storage position corresponding to the server object 1002 of the key storage portion 108.

Thereafter, the lock obtaining portion 101 calls a lock obtaining process for the server object 1003 related to the server object 1002 which is preliminarily stored in the relational object table 100. The lock obtaining portion 101 is responsive to completion of the called lock obtaining process and to reception of a key generated in the lock obtaining process, to store the key in the object-key table 106.

On the other hand, if there is any object related to the server object 1003, the lock obtaining portion 101 calls the lock obtaining process for the object. In FIG. 1, since the server object OS4 is present as the object related to the server object 1003, the lock obtaining process for the server object 1004 is called. The lock obtaining process for the server object 1004 is similar to the lock obtaining process for the server object 1003. In this case, the storage content of the object=key table 106 means a list of the objects locked by own server object 1002.

Furthermore, the lock obtaining portion 101 is responsive to completion of all of the called lock obtaining process (lock obtaining process for the server objects 1003 and 1004), to call a condition varying process for the client objects 2003 and 2004 to notice varying into the lock condition of the client objects 2003 and 2004.

The lock releasing portion 102 is responsive to call from the client object 2002 to receive the key from the client object upon calling. If the key thus received is equal to the key stored in the key storage portion 108, the lock updating process of all server objects 1002 to 1004 stored in the object=key table 106 is called. When all of the called lock updating process is completed, the lock updating portion 103 resets a timer 105 for restarting.

The instruction processing portion 104 is responsive to call from the client object 2002, to receive the key from the client object 2002 upon call. If the key is equal to the key stored in the key storage portion 108, the instruction to the own object is executed. The timer 105 started counts down from a predetermined value and, when the counted value becomes "0", a notice indicative of the counted value being "0" to the lock releasing portion 102.

In the foregoing processing operation, discussion has been given for the case for responding to the call from the client object 2002 shown in FIG. 1. It should be noted that similar operation to the foregoing processing operation will be performed in response to call from other client object 2001, 2003 or 2004 or from the server object 1001 to 1004.

Figure 3:
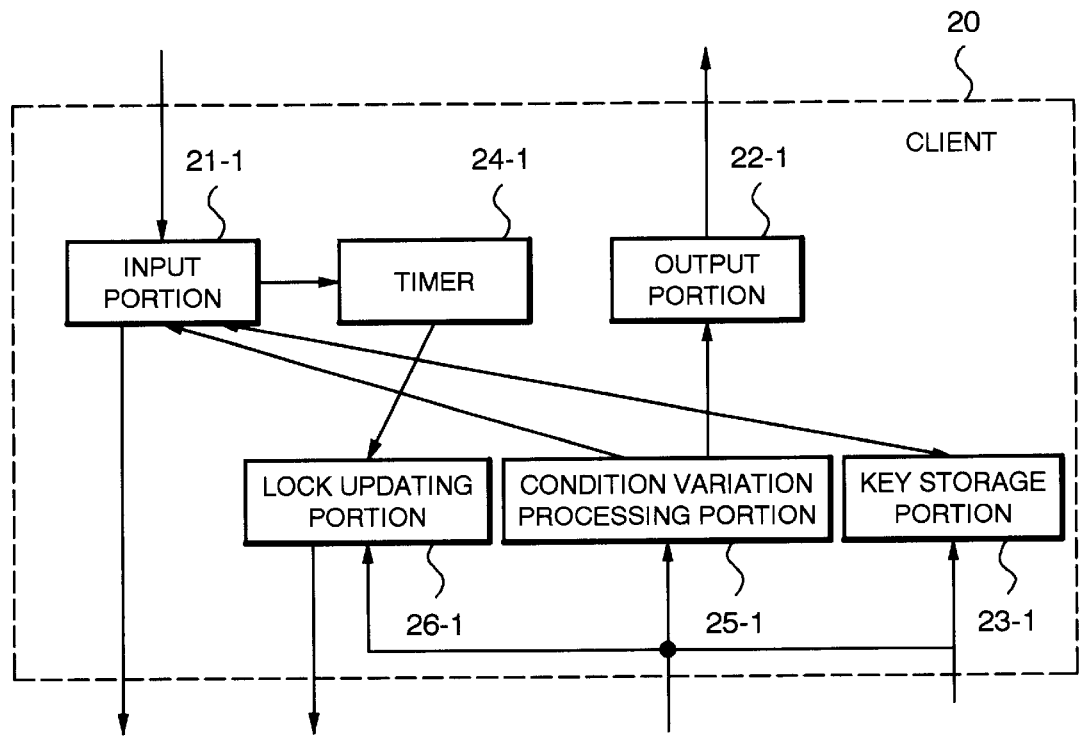
FIG. 3 is a block diagram showing a construction of a client in the network management system shown in FIG. 1.

FIG. 3 is a block diagram showing a construction of the clients 20-1 (20-2, 20-3) of FIG. 1. In FIG. 3, the client 20-1 is constructed with an input portion 21-1, an output portion 22-1, a key storage portion 23-1, a timer 24-1 and a condition variation processing portion 25-1. It should be noted that, while not illustrated in the drawings, the clients 20-2 and 20-3 have the similar construction as that of the client 20-1, and the operation thereof is similar to the operation of the client 20-1 which will be discussed hereinafter.

The input portion 21-1 is responsive to a command input by the operator to restrict input from the operation by the condition variation processing portion 25-1. The output portion 22-1 displays data of the object and lock condition on the screen (not shown). The key storage portion 23-1 stores the key obtained when the server objects 1001 to 1004 are locked.

When the timer 24-1 is started, the lock updating portion 26-1 is called after expiration of a predetermined period. When the condition variation processing portion 25-1 is responsive to the call from the server object 1001 to 1004, if the condition upon call is the lock condition, the input portion 21-1 is called and input from the operator is made null, and in conjunction therewith, the lock condition of the object is displaced on the screen by the output portion 22-1. The lock updating portion 26-1 takes out the key from the key storage portion 23-1 to call the lock updating portion 103 of the server 10.

Figure 4:
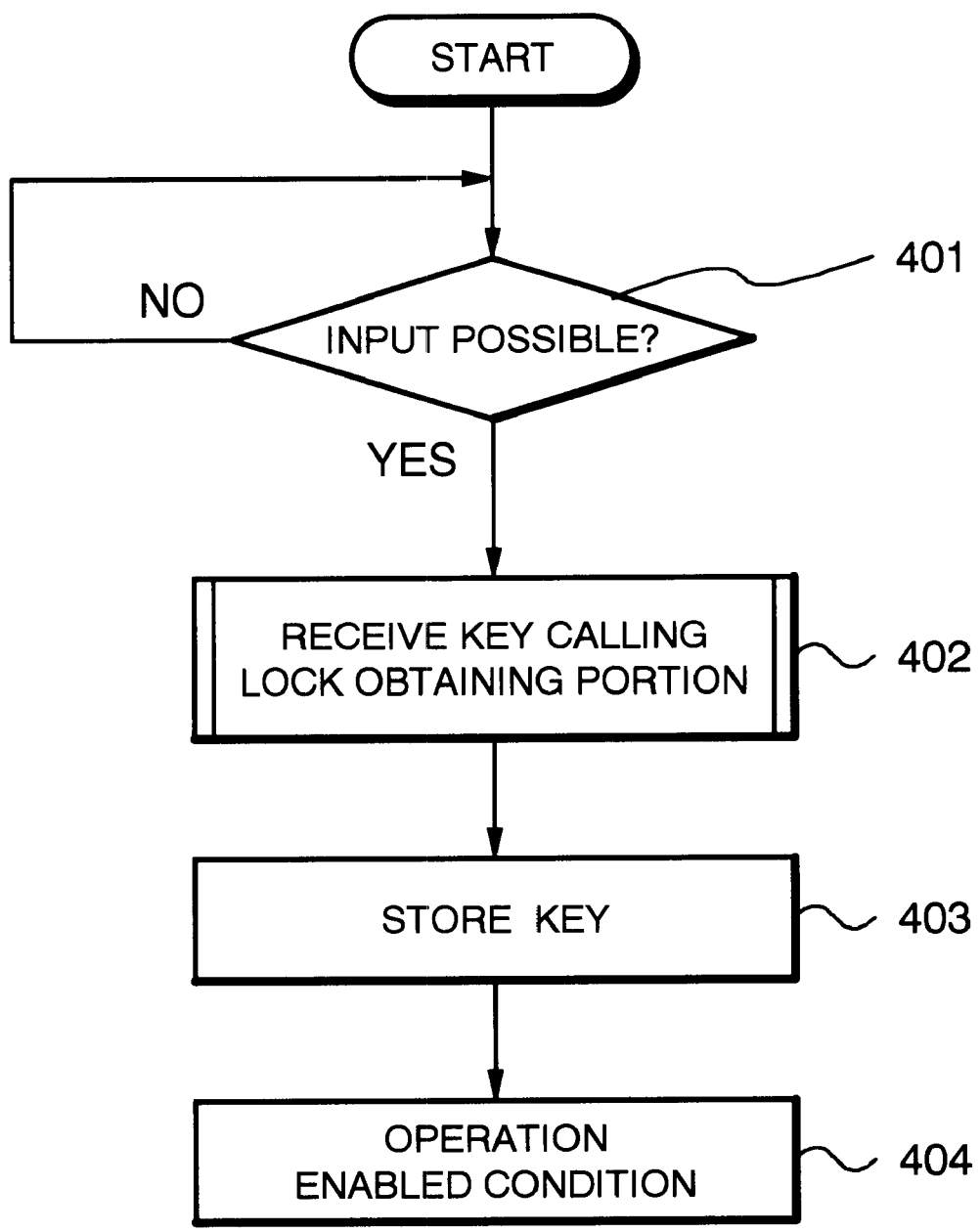
FIG. 4 is a flowchart showing operation of lock obtaining process in a client object of FIG. 1.
Figure 5:
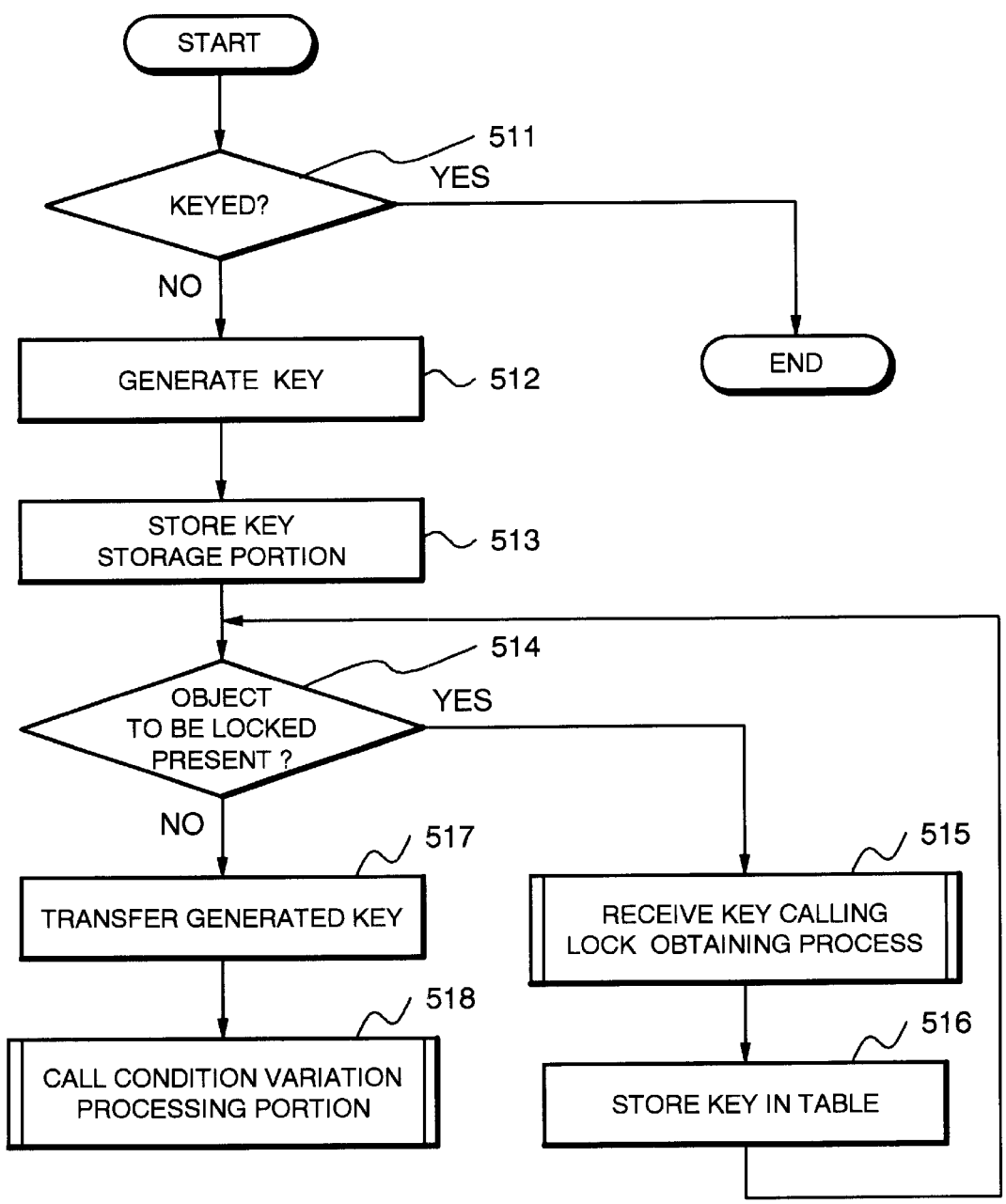
FIG. 5 is a flowchart showing operation of lock obtaining process in a server object of FIG. 1.
Figure 6:
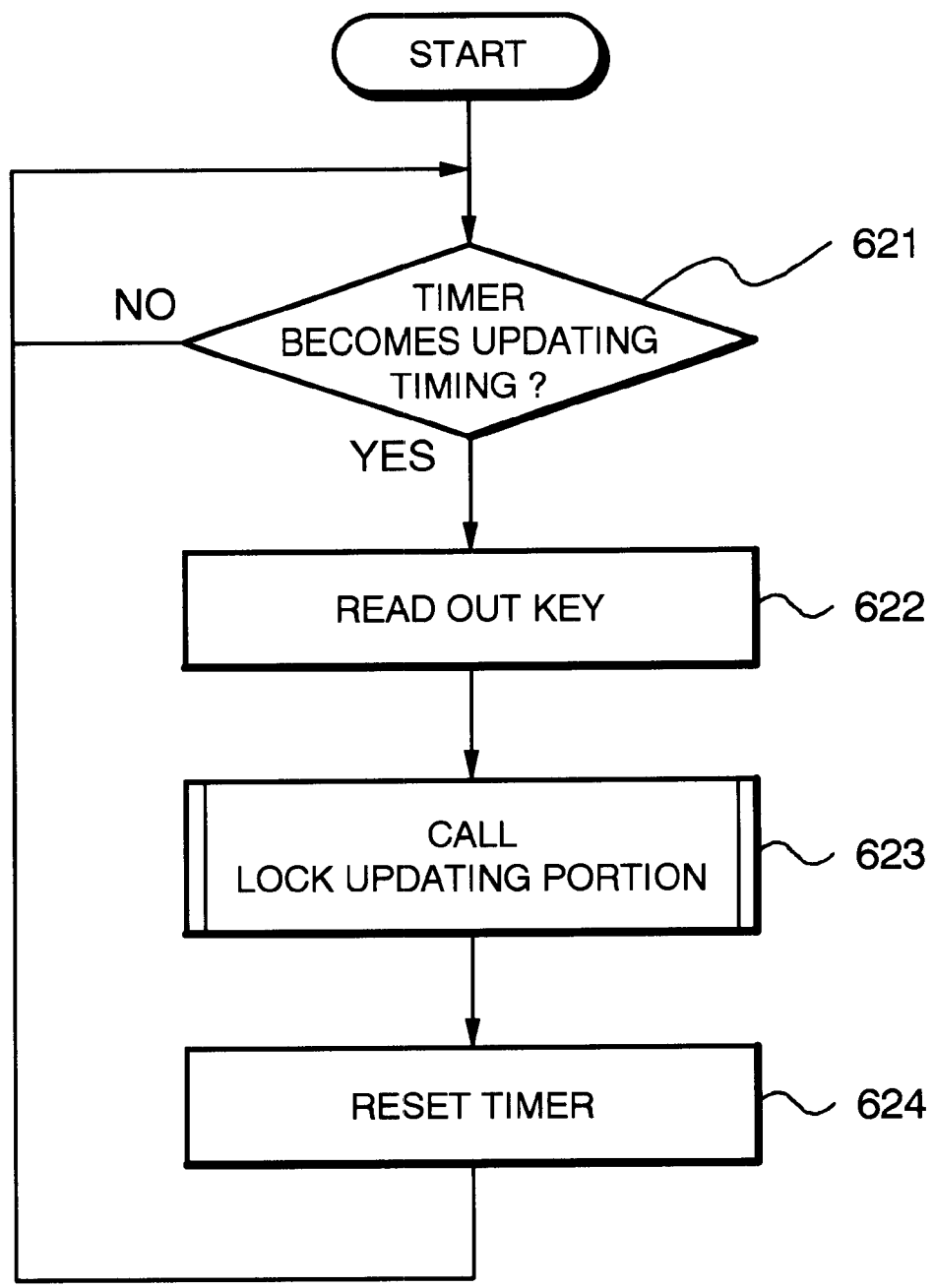
FIG. 6 is a flowchart showing operation of lock updating process in a client object of FIG. 1.
Figure 7:
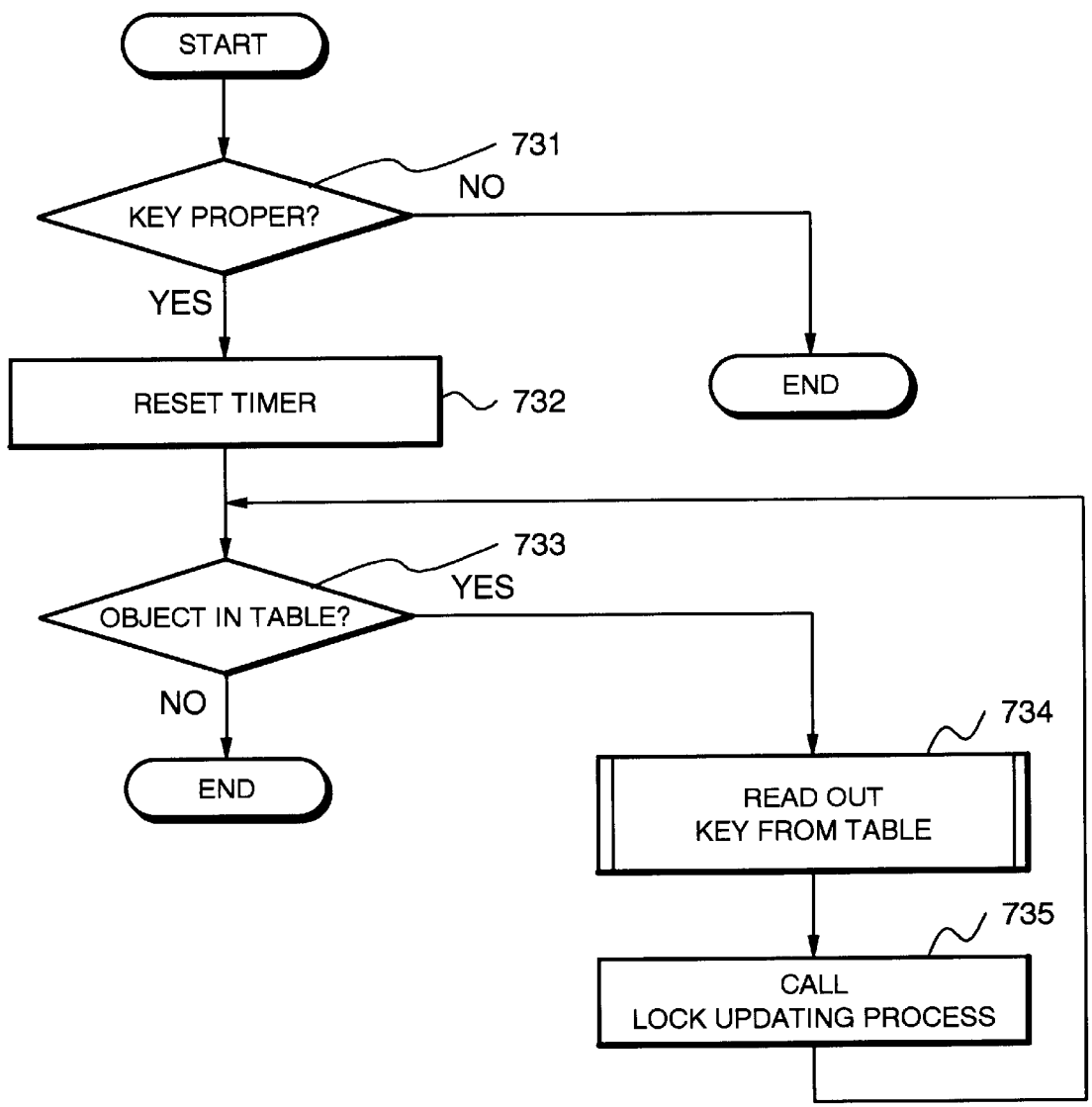
FIG. 7 is a flowchart showing operation of lock updating process in a server object of FIG. 1.

FIG. 4 is a flowchart showing operation of the lock obtaining process in the client object 2001 to 2004 of FIG. 1, and FIG. 5 is a flowchart showing operation of the lock obtaining process in the server object 1001 to 1004 of FIG. 1. On the other hand, FIG. 6 is a flowchart showing operation of the lock updating process in the client object 2001 to 2004 of FIG. 1 and FIG. 7 is a flowchart showing operation of the lock updating process in the server object 1001 to 1004 of FIG. 1.

Figure 8:
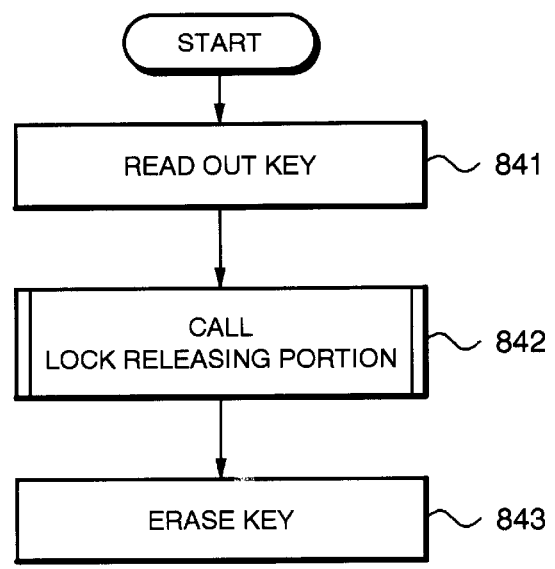
FIG. 8 is a flowchart showing operation of lock releasing process in a client object of FIG. 1.
Figure 9:
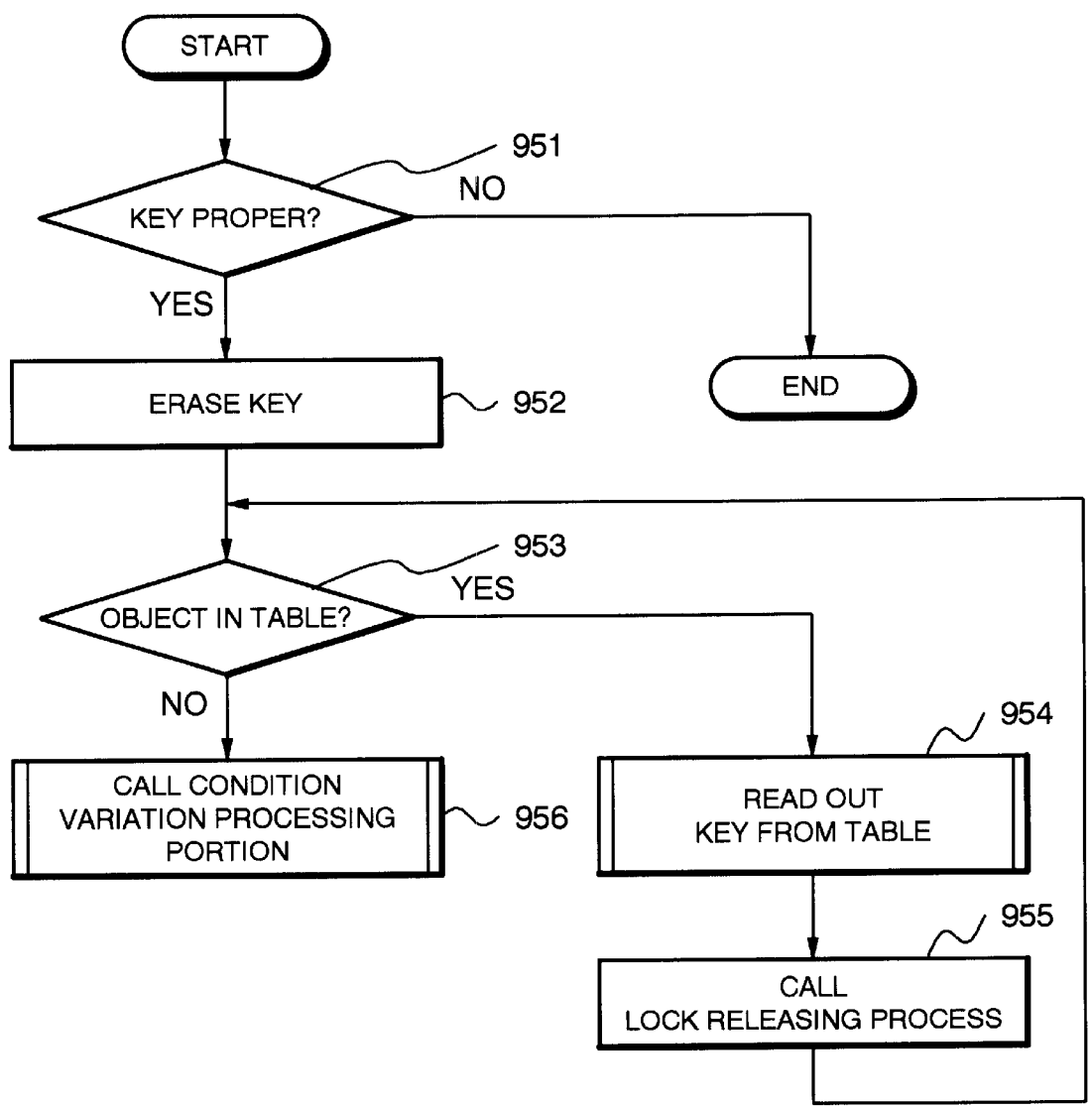
FIG. 9 is a flowchart showing operation of lock releasing process in a server object of FIG. 1.

FIG. 8 is a flowchart showing operation of the lock releasing process in the client object 2001 to 2004 of FIG. 1 and FIG. 9 is a flowchart showing operation of the lock releasing process in the server object 1001 to 1004 of FIG. 1.

Operation of one embodiment of the overall network management system according to the present invention will be discussed with reference to FIGS. 1 to 9. In the shown embodiment of the network management system according to the invention, three operations are performed, basically. The first operation is the operation where the objects are locked sequentially. The second operation is the operation for reflecting the lock condition of the object on the screen. The third operation is the operation where the lock of the object is released by the timer 102 and 24-1. It should be noted that the operation shown in FIGS. 4 to 9 is performed by realizing functions in respective part set forth above by executing the management program stored in a not shown control memory on CPU. On the other hand, as the control memory storing the management program is a magnetic disk, a semiconductor memory or other storage medium.

At first, when the objects are locked sequentially, the clients 20-1 to 20-3 makes judgement whether GUI input of the client objects 2001 to 2004 can be performed by the input portion 21-1 (step 401 of FIG. 4). The GUI of client objects 2001 to 2004 can be input if the server objects 1001 to 1004 are not locked.

Subsequently, the clients 20-1 to 20-3 call the lock obtaining portion 101 of the server 10 for performing lock for the server objects 1001 to 1004 from the input portion 21-1, receives the key when the server objects 1001 to 1004 are locked (step 402 of FIG. 4). The received key is stored in the key storage portion 23-1 (step 403 of FIG. 4). Subsequently, the operation is continued (step 404 of FIG. 4).

On the other hand, in the lock obtaining process, on a server side 10, at first, check is performed whether the server objects 1001 to 1004 are keyed by the lock obtaining portion 101 (step 511 of FIG. 5). In the server 10, if the server objects 1001 to 1004 are not keyed, new key is generated by the key generating portion 107 (step 512 of FIG. 5). The new key thus generated is stored in the key storage portion 108 (step 513 of FIG. 5).

The server objects 1001 to 1004 are keyed, such keyed object cannot be locked. Therefore, without returning the key, the process goes end.

Next, in the server 10, with reference to the relational object table 100, the lock obtaining portion 101 makes judgement whether other object which has to be locked, is present or not (step 514 of FIG. 5). The lock obtaining portion 101 calls the lock obtaining process of the object which is an object for locking, to lock the object, and in conjunction therewith, to receive the key (step 515 of FIG. 5).

The lock obtaining portion 101 stores the received key in the object=key table 106 (step 516 of FIG. 5). On the other hand, the lock obtaining portion 101 repeats the process of the foregoing steps 515 and 516 until no object to be locked is remained.

When no object to be locked is remained (step 514 of FIG. 5), the lock obtaining portion 101 transfers the key generated in the key generating portion 107 to the clients 20-1 to 20-4 (step 517 of FIG. 5) and calls the condition variation processing portions 25-1 of the clients 20-1 to 20-3 (step 518 of FIG. 5). The condition variation processing portion 25-1 makes input from the operator null by calling the input portion 21-1 and varies display screen of the corresponding client object into a display condition indicative of the lock condition.

When the lock condition of the object is maintained, at first, the clients 20-1 to 20-3 make judgement in the lock updating portion 26-1 whether a given period set by the timer 24-1 is expired or not (step 621 of FIG. 6). Expiration of the given period is recognized, the key is read out from the key storage portion 23-1 (step 622 of FIG. 6) to call the lock updating portion 103 of the server 10 for updating the lock for the server objects 1001 to 1004 (step 623 of FIG. 6). Thereafter, the lock updating portion 26-1 resets the timer 24-1 (step 624 of FIG. 6).

Upon continuation of the lock condition, in the server 10, the lock updating portion 103 makes judgment whether the key from the client 20-1 to 20-3 is proper or not (step 731 of FIG. 7). The lock updating portion 103 resets the timer 105 when the key from the client 20-1 to 20-3 is proper (step 732 of FIG. 7). If the key from the client is not proper, the process goes end.

The lock updating portion 103 reads out the key from the object=key table 106 (step 734 of FIG. 7) if the data is present in the object=key table 106 (step 733 of FIG. 7). Then, the lock updating portion 103 calls lock updating process of the corresponding server object 1001 to 1004 to update locking of the corresponding server object 1001 to 1004 (step 735 of FIG. 7). The lock updating portion 103 repeats the process of steps 734 and 735 as long is data present in the object-key table 106.

When the objects are unlocked sequentially, namely when the client objects are released from locking state through operation by the operator, in each client 20-1 to 20-3, the input portion 21-1 reads out the key from the key storage portion 23-1 (step 841 of FIG. 8) and calls the lock releasing portion 102 of the server 10 for releasing lock (step 842 of FIG. 8). Subsequently, the input portion 21-1 erases the key from the key storage portion 23-1 (step 843 of FIG. 8).

On the other hand, on the server side, the lock releasing portion 102 makes judgment whether the key from the client 20-1 to 20-3 is proper or not (step 951 of FIG. 9). The lock releasing portion 102 erases the key from the key storage portion 108 if the key from the client 20-1 to 20-3 is proper (step 952 of FIG. 9).

On the other hand, the lock releasing portion 102 reads out the key from the object=key table 106 (step 954 of FIG. 9) when the data is present in the object=key table 106 (step 953 of FIG. 9) to call the lock releasing process for the corresponding server object SO1 to SO4 to release the lock of the corresponding server object SO1 to SO4 (step 955 of FIG. 9). The lock releasing portion 102 repeats the process of the steps 954 and 955 as long as data present in the object=key table 106.

When no data presents in the object=key table 106 any more, the lock releasing portion 102 calls the condition variation processing portion 25-1 of the client 20-1 to 20-3 to notice variation of the condition to all of the client objects 2001 to 2004 corresponding to the server objects 1001 to 1004 (step 956 of FIG. 9).

In the case unlocking is effected by timeout of the timer 105, when the timer in the server 10 detects expiration of the given period, the lock releasing portion 102 is called to release locking for all of the server objects 1001 to 1004 and the server objects 1001 to 1004 stored in the object=key table 106. On the other hand, the keys in the key storage portion 108 are erased.

Next, the lock releasing portion 102 calls the condition variation processing portion 25-1 of the client 20-1 to 20-3 to notice variation of condition to all client objects 2001 to 2004 corresponding to the server objects 1001 to 1004, and in conjunction therewith, to erase key information in the key storage portion 23-1 of the client.

When the server object 1001 to 1004 becomes locked condition, the display on the display screen of the client objects 2001 to 2004 are varied to show the lock condition by the condition variation processing portion 25-1 of the client 20-1 to 20-3 to restrict input of the operator.

On the other hand, when the server object 1001 to 1004 becomes unlocked condition, display of the client object 2001 to 2004 is varied to show the unlocked condition. Then, restriction for input to GUI of the client 20-1 to 20-3 is released.

Figure 10:
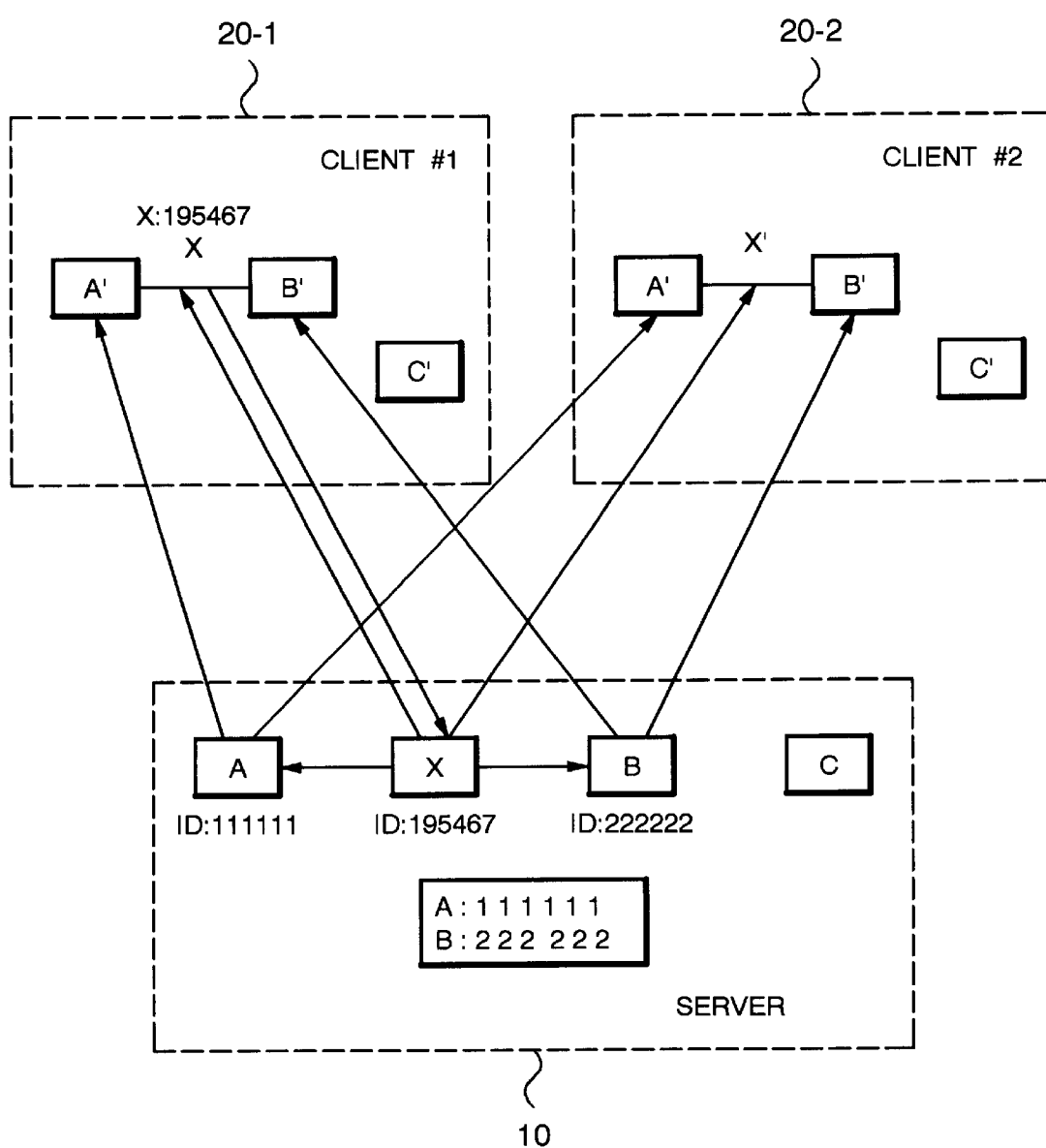
FIG. 10 is an illustration showing a particular example of operation in one embodiment of the network management system according to the present invention.

FIG. 10 is an illustration showing particular embodiment of operation in one embodiment of the network management system according to the present invention. Using FIG. 10, particular operation in one embodiment of the network management system according to the present invention will be discussed.

All of A, B, C, X in the server 10 are server objects, all of A', B', C', X' in the clients 20-1 and 20-2 are client objects corresponding to all of the server objects, which are symbols displayed on the display screen of the clients 20-1 and 20-2.

When operation is attempted operation, such as to vary the value to the client object X' in the client 20-1 by the operator, the client 20-1 calls the lock obtaining process of the server object X corresponding to the client object X'.

In the lock obtaining process of the server object X, upon locking of the server object X, a value "195467" is generated as the key, for example. On the other hand, since the server object X is associated with the server objects A, B (arrow between the server objects represents associating direction thereof, lock obtaining process of the server object X is performed by locking the server object X, and in conjunction therewith, by locking the server objects A, B with calling the lock objecting process of the server objects A, B.

In the lock obtaining process of the server objects A, B, respective keys ("111111" for A and "222222" for B) are generated to transfer to the lock obtaining process of the server object X.

In the lock obtaining process of the server object X, these keys are managed by the object=key table 106. On the other hand, the keys generated by the lock obtaining process of the server object X are transferred to the client 20-1. By this, operation for the server object X cannot be performed unless through the client object X' of the client 20-1. On the other hand, operation for the server objects A and B cannot be effected from the clients 20-1 and 20-2.

On the other hand, since the server object C is not locked, the server object C can be operated from the client 20-1 and 20-1. On the other hand, when the server objects A, B and X are locked, displays of the client objects A', B' and X' respectively corresponding thereto are varied.

As set forth, by preliminarily registering other server objects 1001 to 1004 associated with the server object 1001 to 1004 in a relational object table 100, locking is performed by calling lock obtaining process of the associated other server object 1001 to 1004 upon lock obtaining process of one server object 1001 to 1004. By this, even when a plurality of operators do not pay attention to the relationship of the objects to be managed displayed on the display screen, discrepancy or unmatching of data may not be caused even if the object to be managed is operated simply by preliminarily registering the connection between the objects mutually associated in the relational object table 100.

The lock condition of other server objects 1001 to 1004 by operation to the object to be managed can be displayed on the display screen in real-time on all of the clients 20-1 to 20-3 by performing condition variation process for the clients 20-1 to 20-3. Therefore, it becomes possible to make judgement whether the object displayed on the network chart is in a condition where operation therefor is permitted or not, before actually performing operation.

Furthermore, timeout is caused in the timer by expiration of the given period without updating with maintaining the lock condition of the object to be managed, deadlock may not be caused even in the case where the clients 20-1 to 20-3 causes failure in the network with maintaining the lock condition by releasing the lock condition of the object to be managed by the lock releasing portion 102.

Accordingly, the operator will never be required useless operation to realize multi-operator without making the locking process of other associated server complicate.

It should be noted that while discussion has been given for a network consisted of one server and three clients in the embodiment set forth above, number of the servers and clients consisting the network is not limited to the shown embodiment.

As set forth above, according to the present invention, in the network management system including the manager for performing management operation of the network, multi-operator can be realized without requiring useless operation by the operator and making the process complicate, by making the manager to operate as client server, autonomously making access to the client exclusive by the object in the server program, and reflecting exclusive condition of the object on the display screen of the client.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A network management system for a network, in which server objects operate on a server, and client objects corresponding to respective ones of said server objects operate on a client, wherein said server comprises:

means for locking a server object when a condition of said server object is varied;

means for notifying the locked condition to all of the client objects corresponding to said locked server object.

2. A network management system as set forth in claim 1, wherein said client comprises:

means for varying a display of said client object on a display screen to show said locked condition.

3. A network management system as set forth in claim 1, wherein said client comprises:

means for restricting external operation of said client object when display of said client object is varied.

4. A network management system as set forth in claim 1, wherein said server comprises: storage means for storing information of other server objects associated with said server object.

5. A network management system as set forth in claim 1, wherein said server comprises:

timer means for detecting whether a given period has elapsed after locking of said server object; and means for releasing locked condition of all of said server objects upon said detection of elapsed period.

6. A network management system as set forth in claim 1, wherein said client comprises:

timer means for measuring a lock continuation period of said server object; and means for calling lock condition updating process when a lock continuation period elapses; and said server comprises:

means for updating lock condition of said server object depending upon call from said client.

7. A network management system for a network, in which server objects operate on a server, and client objects corresponding to respective ones of said server objects operate on a client, wherein said server comprises:

means for locking a server object when a condition of said server object is varied;

means for notifying the locked condition to all of the client objects corresponding to said locked server object; means for generating key information specifying said server object upon locking of said server object; and storage means for storing said key information, management of locking condition for said server object and management of variation of a display of said client object on the basis of the content of said storage means.

8. A network management system for a network, in which server objects operate on a server, and client objects corresponding to respective ones of said server objects operate on a client, wherein said server comprises:

means for locking a server object when a condition of said server object is varied;

means for notifying the locked condition to all of the client objects corresponding to said locked server object;

means for generating key information specifying said server object upon locking of said server object;

storage means for storing said key information corresponding to said server object; and means for updating lock condition of said server object depending upon call from said client; and said client comprises:

key storage means for storing key information from said server;

timer means for measuring a lock continuation period of said server object; and means for calling updating process of lock condition by reading out the key information from said key storage means when the lock continuation period elapses;

said lock condition updating means of said server updating the locking of said server object corresponding to said key information when called from said client.

9. A network management system for a network, in which server objects operate on a server, and client objects corresponding to respective ones of said server objects operate on a client, wherein said server comprises:

means for locking a server object when a condition of said server object is varied;

means for notifying the locked condition to all of the client objects corresponding to said locked server object;

means for generating a key information specifying said server object upon locking of said server object;

storage means for storing said key information corresponding to said server object; and means for updating lock condition of said server object depending upon call from said client;

means for releasing the lock of said server object;

said client comprises:

key storage means for storing key information from said server;

timer means for measuring a lock continuation period of said server object; and means for calling lock condition updating process by reading out the key information from said key storage means when the lock continuation period elapses, said lock releasing means of said server releasing the lock of said server object when the key information from said client is proper.

10. A network management system for a network, in which server object operates on a server and client object corresponding to said server object operates on a client, wherein said server comprises:

means for excluding access from other clients by locking the server object on the server corresponding to the client object to be operated on the client; and means for reflecting exclusive condition of said server object in real-time.

11. A management method in a network management system for a network, in which server object operates on a server and client object corresponding to said server object operates on a client, comprising the steps of:

said server locking a server object when a condition of said server object is varied;

locking other server objects associated with said one of server objects; and notifying the locked condition to all of the client objects corresponding to said locked server object.

12. A network management method as set forth in claim 11, wherein said client varies the display of said client object on a display screen to show said locked condition.

13. A network management method as set forth in claim 11, wherein said client restricts external operation of said client object when display of said client object is varied.

14. A network management method as set forth in claim 11, wherein said server detects whether a given period has elapsed after the locking of said server object; and releases the locked condition of said server object upon said detection.

15. A network management method as set forth in claim 11, wherein said client measures a lock continuation period of said server object; and calls lock condition updating process when a lock continuation period of said timer elapses; and said server updates the lock condition of said server object depending upon said call from said client.

16. A management method in a network management system for a network, in which server object operates on a server and client object corresponding to said server object operates on a client, comprising the steps of:

said server locking a server object when a condition of said server object is varied;

locking other server objects associated with said one of server objects; and notifying the locked condition to all of the client objects corresponding to said locked server object;

wherein said server generates a key information specifying said server object upon locking of said server object;

stores said key information corresponding to said server object; and manages the locked condition of said server object and varies the display of said client object on the basis of said stored key information.

17. A management method in a network management system for a network, in which server object operates on a server and client object corresponding to said server object operates on a client, comprising the steps of:

said server locking a server object when a condition of said server object is varied;

locking other server objects associated with said one of server objects; and notifying the locked condition to all of the client objects corresponding to said locked server object;

wherein said server generates a key information specifying said server object upon locking of said server object;

stores said key information corresponding to said server object;

updates the lock condition of said server object depending upon call from said client; and said client stores key information from said server;

measures a lock continuation period of said server object; and calls the lock condition updating process by reading out the key information from said key storage means when the lock continuation period of said timer elapses.

18. A management method in a network management system for a network, in which server object operates on a server and client object corresponding to said server object operates on a client, comprising the steps of:

said server locking a server object when a condition of said server object is varied;

locking other server objects associated with said one of server objects; and notifying the locked condition to all of the client objects corresponding to said locked server object;

wherein said server generates a key information specifying said server object upon locking of said server object;

stores said key information corresponding to said server object;

updates lock condition of said server object depending upon call from said client; and said client stores key information from said server; and calls lock releasing process of said server by identifying said server object by said key information, and erases said key information.

19. A management method in a network management system for a network in which a server object operates on a server and a client object corresponding to said server object operates on a client, comprising the steps of:

excluding access from at least one other client by locking the server object on the server corresponding to said client object; and reflecting exclusive condition of said server object in real-time.

20. A computer readable memory storing a management program active in a network management system for a network, in which a server object operates on a server and a client object corresponding to said server object operates on a client, said management program comprising the steps of:

locking a server object when a condition of said server object is varied;

locking other server objects associated with said server object; and notifying the locked condition to all of the client objects corresponding to said locked server object.

21. A computer readable memory as set forth in claim 20, wherein a management program of said client varies the display of said client object on a display screen to show said locked condition.

22. A computer readable memory as set forth in claim 20, wherein a management program of said client restricts external operation of said client object when display of said client object is varied.

23. A computer readable memory as set forth in claim 20, wherein a management program of said server detects whether a given period has elapsed after said locking said server object; and releases locked condition of all of said server objects upon said detection.

24. A computer readable memory as set forth in claim 20, wherein a management program of said client measures a lock continuation period of said server object; and calls a lock condition updating process when a lock continuation period exceeds a given time period; and said server updates said lock condition of said server object depending upon call from said client.

25. A computer readable memory storing a management program active in a network management system for a network, in which a server object operates on a server and a client object corresponding to said server object operates on a client, said management program comprising the steps of:

locking a server object when a condition of said server object is varied;

locking other server objects associated with said server object;

notifying the locked condition to all of the client objects corresponding to said locked server object;

wherein a management program of said server generates a key information specifying said server object upon locking of said server object;

stores said key information corresponding to said server object; and manages the locking condition for said server object and manages the variation of the display of said client object on the basis of said stored key information.

26. A computer readable memory storing a management program active in a network management system for a network, in which a server object operates on a server and a client object corresponding to said server object operates on a client, said management program comprising the steps of:

locking a server object when a condition of said server object is varied;

locking other server objects associated with said server object; and notifying the locked condition to all of the client objects corresponding to said locked server object;

wherein a management program of said server generates a key information specifying said server object upon locking of said server object;

stores said key information corresponding to said server object; and updates said lock condition of said server object depending upon a call from said client, and a management program of said client stores said key information from said server;

measures a lock continuation period of said server object; and calls said lock condition updating process by reading out the key information from said key storage means when the lock continuation period of exceeds a given period.

27. A computer readable memory storing a management program active in a network management system for a network, in which a server object operates on a server and a client object corresponding to said server object operates on a client, said management program comprising the steps of:

locking a server object when a condition of said server object is varied;

locking other server objects associated with said server object; and notifying the locked condition to all of the client objects corresponding to said locked server object;

wherein a management program of said server generates a key information specifying said server object upon locking of said server object;

stores said key information; and updates said lock condition of said server object depending upon a call from said client; and a management program of said client stores key information from said server;

calls a lock releasing process of said server by identifying said server object by said key information; and erases said key information.

\* \* \* \* \*